United States Patent [19]
Yajima et al.

[11] Patent Number: 5,177,372
[45] Date of Patent: Jan. 5, 1993

[54] PARALLEL OPERATION POWER SUPPLY CONTROL SYSTEM

[75] Inventors: Hideharu Yajima, Tokyo; Hiroshi Tachikawa, Yamanashi, both of Japan

[73] Assignee: NEC Corporation, Tokyo, Japan

[21] Appl. No.: 611,787

[22] Filed: Nov. 13, 1990

[30] Foreign Application Priority Data
Nov. 13, 1989 [JP] Japan ................................. 1-292203

[51] Int. Cl.⁵ .............................................. H02J 3/38
[52] U.S. Cl. ......................................... 307/85; 307/58
[58] Field of Search ....................... 307/85, 83, 71, 43, 307/58, 55; 363/65, 95

[56] References Cited
U.S. PATENT DOCUMENTS

| | | | |
|---|---|---|---|
| 4,520,275 | 5/1985 | Marusik | 307/64 |
| 4,920,309 | 4/1990 | Szepesi | 323/269 |
| 4,924,170 | 5/1990 | Henze | 323/272 |

*Primary Examiner*—Sharon D. Logan
*Assistant Examiner*—Aditya Krishnan
*Attorney, Agent, or Firm*—Burns, Doane, Swecker & Mathis

[57] ABSTRACT

A parallel operation power supply control system has a plurality of switching power supply modules for supplying electric power in parallel to a logic device, and a parallel operation power supply control module connected to a superior controller for control of the plurality of the switching power supply modules. Each of the plurality of the switching power supply modules comprises a DC-DC converter, a drive pulse generator for driving the DC-DC converter, and an electric current feedback unit for detecting an electric current outputted from the DC-DC converter and for feeding the detected result in the form of a first data to the parallel operation power supply control module. The parallel operation power supply control module comprises an arithmetic processor for arithmetically processing the first data fed from the plurality of the switching power supply modules to produce corresponding second data, a plurality of error amplifiers for producing error data according to the second data and a voltage inputted into the logic device and for outputting the error data to each drive pulse generator, and a basic pulse generator for outputting basic pulses to each drive pulse generator.

3 Claims, 2 Drawing Sheets

PARALLEL OPERATION POWER SUPPLY CONTROL SYSTEM

BACKGROUND OF THE INVENTION

The present invention relates to a parallel operation power supply control system.

In the conventional parallel operation power supply control system, each of switching power supply modules operated in parallel to one another is provided with an output voltage trailing circuit having an operating point at vicinity of a rating output current. This output voltage trailing circuit operates when an output current of the corresponding switching power supply module exceeds a rating output current for lowering the output voltage at the vicinity of the rating output current region so as to avoid overflow of the output current above the rating value.

In the conventional parallel operation power supply control system utilizing the output voltage trailing circuit, the output currents of the respective switching power supply modules connected in parallel to one another are not balanced with each other. Therefore, a particular switching power supply module tends to continuously flow a great amount of electric current, and receives an excess load, thereby causing a drawback in view of the reliability.

Further, when balancing the output currents among a plurality of switching power supply modules, there is caused a drawback in that current regulation is complicated and time-consuming because of a very small value of the output impedance below the rating output current value. In addition, there is another drawback that the output voltage of the switching power supply module is not stable after the regulation.

SUMMARY OF THE INVENTION

An object of the present invention is to, therefore, balance output currents of a plurality of switching power supply modules as well as to stabilize output voltages of the switching power supply modules.

According to the invention, the parallel operation power supply control system has a plurality of switching powers supply modules for supplying electric powers in parallel to a logic device, and a parallel operation power supply control module connected to a superior controller for control of the plurality of the switching power supply modules. Each of the plurality of the switching power supply modules comprises a DC-DC converter, a drive pulse generator for driving the DC-DC converter, and an electric current feedback unit for detecting an electric current outputted from the DC-DC converter and for feeding the detected result in the form of a first data to the parallel operation power supply control module. Further, the parallel operation power supply control module comprises an arithmetic processor for arithmetically processing the first data fed from the plurality of the switching power supply modules to produce corresponding second data, a plurality of error amplifiers for producing error data according to the second data and a voltage inputted into the logic device and for outputting the error data to each drive pulse generator, and a basic pulse generator for outputting basic pulses to each drive pulse generator.

In the present invention, two or more of the switching power supply modules are connected in parallel to each other at their stabilized power supply output terminals. An output current of each switching power supply module is detected as a first analog data, which is fed to a parallel operation power supply control module. Further, each switching power supply module receives from the parallel operation power supply control module an error data produced through digital processing and basic pulses from the digital pulse generator so as to drive the drive pulse generator to control unstabilized input voltage to thereby output a stabilized output voltage from each switching power supply module to a logic device.

On the other hand, in the parallel operation power supply control module, the first analog data indicative of the output current fed from each switching power supply module is A/D-converted for digital processing so as to calculate the deviation of the output current value based on a mean value of all the output currents. If the deviation amount falls outside of a predetermined allowance range, the A/D-converted data of the first analog data is processed by subtraction or addition according to the deviation amount, and the thus obtained results are applied with D/A conversion to determine the second analog data. Further in the parallel operation power supply control module, an output voltage is detected at a given node of the stabilized power supply output terminals of the two or more of the switching power supply modules. The detected result is inputted into each error amplifier, and is then compared to the corresponding second analog data produced by the digital processing. Then in order to stabilize the output voltage, the error data which is the result of the comparison is fed to each switching power supply module.

DETAILED DESCRIPTION OF EMBODIMENTS

Hereinafter, an embodiment of the present invention will be described in detail with reference to the drawings.

Figure 1A:
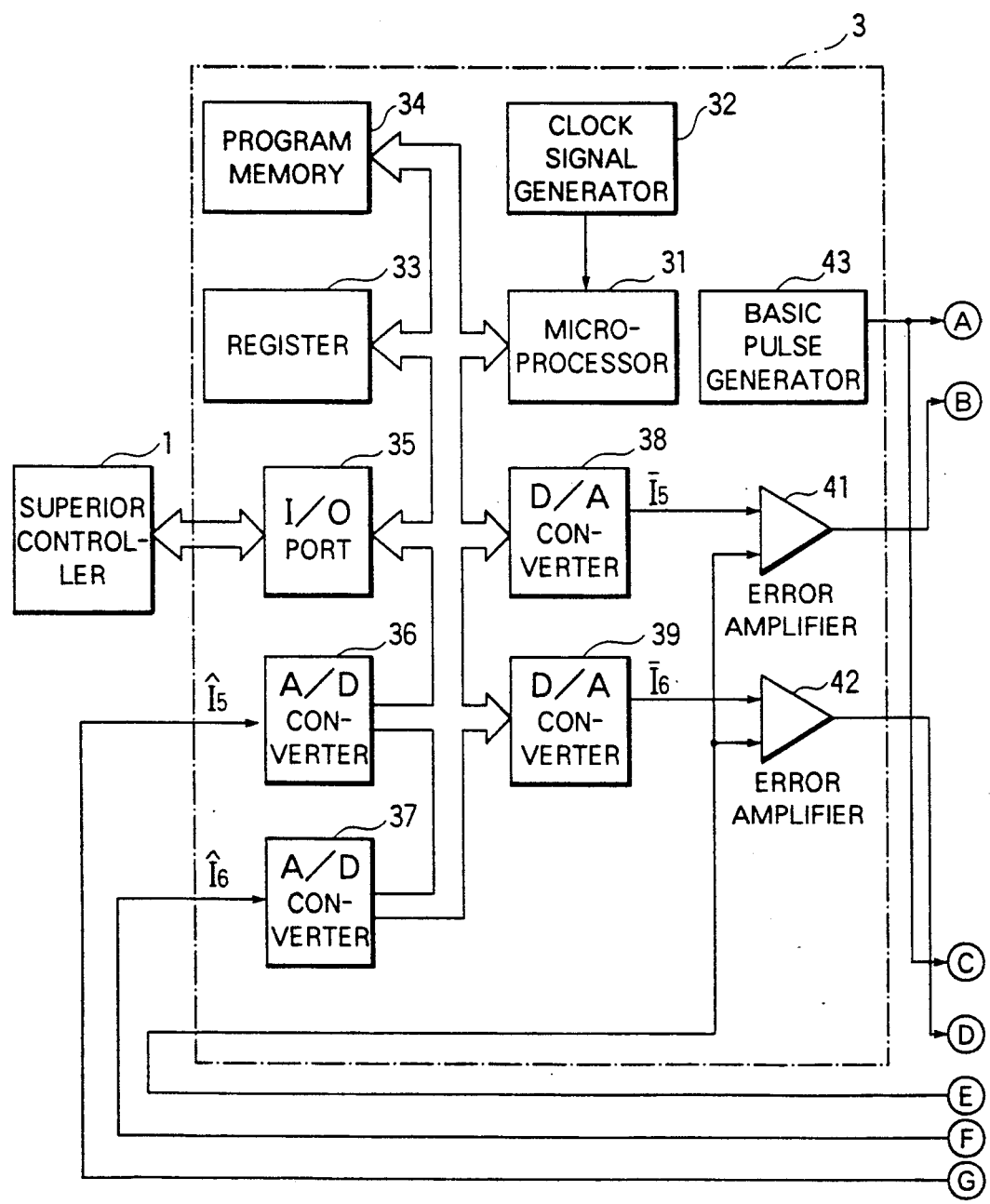
FIGS. 1 (*a*) and 1 (*b*) are block diagrams showing one embodiment of the parallel power supply control system according to the present invention.
Figure 1B:
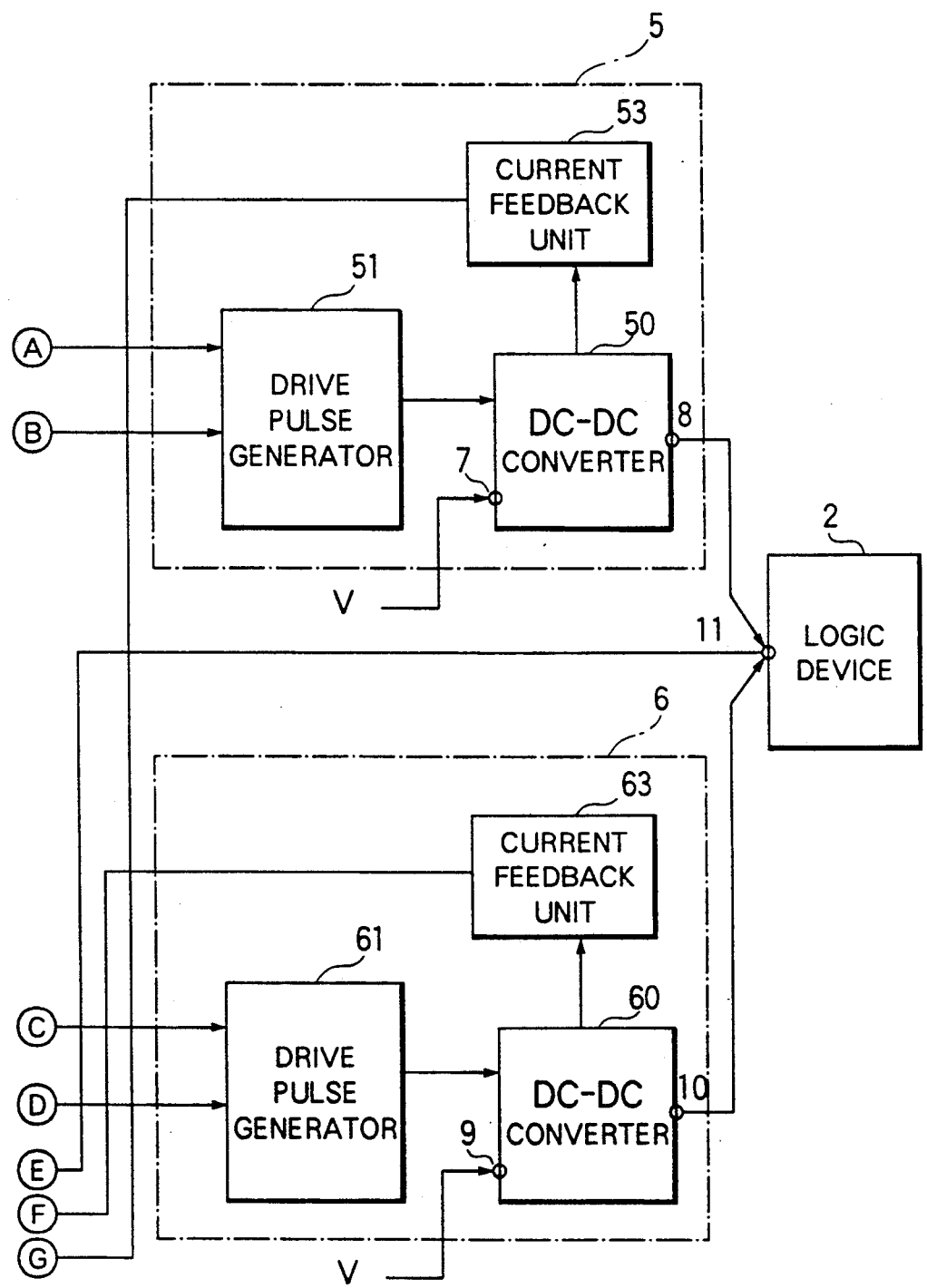

FIGS. 1 (*a*) and 1 (*b*) show one embodiment of the parallel operation power supply control system according to the present invention.

The parallel operation power supply control system of FIGS. 1 (*a*) and 1 (*b*) are comprised of a superior controller 1, a parallel operation power supply control module 3 (FIG. 1 (*a*)), and a pair of first and second switching power supply modules 5 (FIG. 1 (*b*)) and 6 effective to supply electric power to a logic device 2.

The parallel operation power supply control module 3 is comprised of a microprocessor 31, a clock signal generator 32, a register 33, a program memory 34, an I/O port 35, a first A/D converter 36, a second A/D converter 37, a first D/A converter 38, a second D/A converter 39, a first error amplifier 41, a second error amplifier 42, and a basic pulse generator 43. This parallel operation power supply control module 3 is connected to the superior controller 1 provided with an interface.

The first switching power supply module 5 is comprised of a drive pulse generator 51, and a DC-DC converter 50 provided with an unstabilized power supply input terminal 7 and a stabilized power supply output terminal 8. In similar manner, the second switching power supply module 6 is comprised of a drive pulse generator 61, and a DC-DC converter 60 provided with an unstabilized power supply input terminal 9 and a stabilized power supply output terminal 10.

These first and second switching power supply modules 5 and 6 stabilize an output voltage which is outputted to the logic device 2 through a power supply terminal 11. In addition, the power supply terminal 11 is connected also to the error amplifiers 41 and 42 of the parallel operation power supply control module 3.

The basic pulse generator 43 feeds pulses to the drive pulse generators 51 and 61 to start the same. The drive pulse generators 51 and 61 control, respectively, the DC-DC converters 50 and 60 to enable the same to stabilize voltages applied to the input terminals 7 and 9 to feed stabilized voltages to the logic device 2.

The DC-DC converters 50 and 60 flow to the logic device 2 electric currents which are detected, respectively, by current feedback units 53 and 63 by a given constant time interval so that the detected results are fed back, respectively, to the parallel operation power supply control module 3 in the form of a pair of first analog data $\hat{I}_5$ and $\hat{I}_6$.

The pair of analog data $\hat{I}_5$ and $\hat{I}_6$ are converted into a corresponding pair of digital data $I_5$ and $I_6$ by the respective A/D converters 36 and 37 in the parallel operation power supply control module 3. The pair of converted digital data $I_5$ and $I_6$ are arithmetically processed under control of the microprocessor 31.

This arithmetic processing is carried out such that the sum of the pair of digital data $(I_5+I_6)$ is compared to values of the respective digital data multiplied by the number of digital data, i.e. in this case, compared to $2 \times I_5$ and $2 \times I_6$, respectively. Stated otherwise, the mean value of all the digital data and the respective digital data value are compared to each other. As a result of the comparison, if a digital data is greater than a given value with respect to the mean value level, a predetermined value is subtracted from such digital data to determine a new reference data. On the other hand, if a digital data is smaller than a given value with respect to the mean value, a predetermined value is added to such digital data to determine a new reference data. These new reference data are called second analog data. Further, if there is no greater difference than the given value, the current digital data is held as it is to determine a new reference data. By such processing, reference data $\overline{I}_5$ and $\overline{I}_6$ are obtained correspondingly to the respective digital data $I_5$ and $I_6$.

For example, the microprocessor 31 compares the sum of the digital data which correspond to output currents $\hat{I}_5$ and $\hat{I}_6$ to the values of the respective digital data multiplied by number of the power supply modules connected in parallel (in this case, the number is two). Then, if the latter value is greater than the former value by 1A, one unit value is subtracted from that digital value to generate a reference data for a corresponding switching power supply module. On the other hand, the latter value is smaller than the former value by 1A, one unit value is added to that value to generate a reference data for a corresponding switching power supply module.

These reference data $\overline{I}_5$ and $\overline{I}_6$ are inputted into the respective D/A converters 38 and 39 and are converted into corresponding analog signals. The converted reference data $\overline{I}_5$ and $\overline{I}_6$ are inputted into the respective error amplifiers 41 and 42.

The error amplifiers 41 and 42 are inputted also with the input voltage which is fed to the logic device 2 through the power supply terminal 11. The error amplifiers 41 and 42 operate to compare this input voltage with the respective reference data $\overline{I}_5$ and $\overline{I}_6$ to produce a corresponding pair of error data, which are inputted into the respective drive pulse generators 51 and 61.

The drive pulse generators 51 and 61 drive the corresponding DC-DC converters 50 and 60 based on the pulse signal from the basic pulse generator 43, while they control the pulse width of the drive pulses based on the error data fed from the error amplifiers 41 and 42. By such operation, balancing is effected between the pair of electric currents inputted into the logic device from the two switching power supply modules so as to stabilize the input voltage.

According to the present invention, detection is carried out for electric currents outputted from the switching power supply modules, and the arithmetic processing is effected in the microprocessor for producing the reference data based on the detected values of the electric currents. Further, the error data are obtained from these reference data and the input voltages, and the drive pulse generator is driven according to the error data and the basic pulse fed from the basic pulse generator. By such construction, output voltages from all of the switching power supply modules are stabilized, and concurrently balancing of the output currents can be ensured.

What is claimed is:

1. A parallel operation power supply control system comprising: a plurality of switching power supply modules for supplying electric power in parallel to a logic device, and a parallel operation power supply control module connected to a superior controller for control of said plurality of switching power supply modules, wherein each of said plurality of switching power supply modules comprises a DC-DC converter, a drive pulse generator for driving said DC-DC converter, and an electric current feedback unit for detecting an electric current outputted from said DC-DC converter and for feeding the detected result in the form of a first data to said parallel operation power supply control module, and wherein said parallel operation power supply control module comprises an arithmetic processor for arithmetically processing the first data respectively fed from each of said plurality of switching power supply modules by comparing each of said first data from said plurality of switching power supply modules to the total of the first data from said plurality of switching power supply modules to produce corresponding second data, a plurality of error amplifiers each for producing corresponding error data according to the corresponding second data and for a voltage inputted into said logic device for outputting the corresponding error data to a corresponding said drive pulse generator, and a basic pulse generator for outputting basic pulse to each said drive pulse generator.

2. A parallel operation power supply control system as claimed in claim 1, wherein said arithmetic processor includes means for comparing each first data to a mean value of all of the first data to form the corresponding second data according to comparison results.

3. A parallel operation power supply control system as claimed in claim 1, wherein each said drive pulse generator includes means operative according to the corresponding error data to control a width of drive pulses applied to a corresponding said DC-DC converter.

* * * * *